Figure 1:
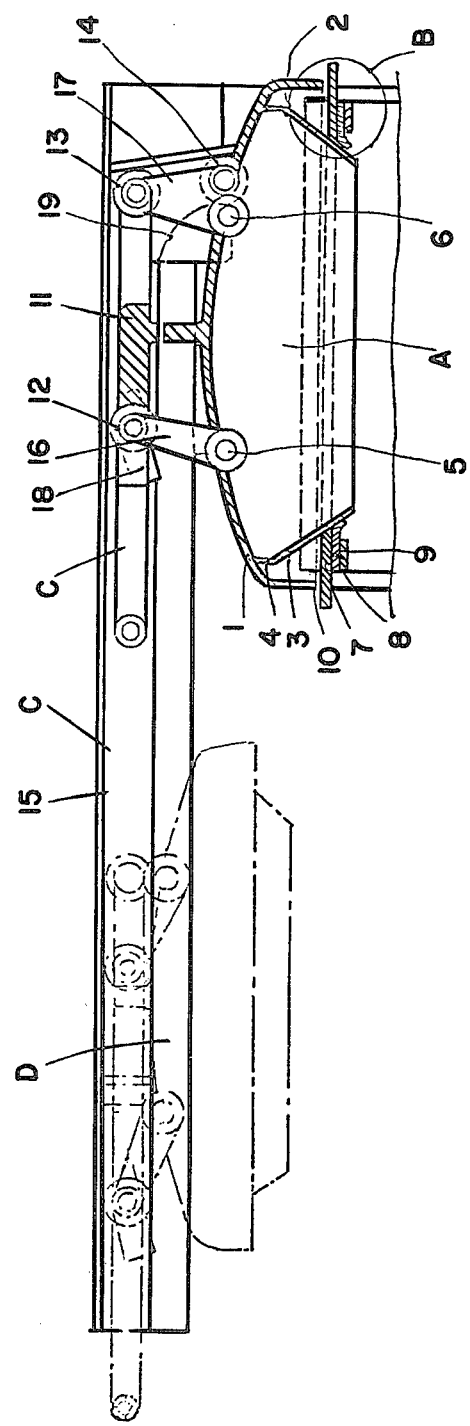

United States Patent [19]

Volpeliere

[11] 4,192,435
[45] Mar. 11, 1980

[54] SELF-SEALING CLOSURE DEVICE FOR TRANSPORT TANK

[75] Inventor: Jacky Volpeliere, Gardanne, France

[73] Assignee: Aluminum Pechiney, Lyons, France

[21] Appl. No.: 23,542

[22] Filed: Mar. 26, 1979

[30] Foreign Application Priority Data

Apr. 7, 1978 [FR] France ................................ 78 10998

[51] Int. Cl.² ....................... B65D 43/14; B65D 51/04
[52] U.S. Cl. ..................................... 220/331; 220/213; 220/345
[58] Field of Search ............... 220/329, 331, 345, 346, 220/213; 49/254, 340

[56] References Cited

U.S. PATENT DOCUMENTS

| 3,386,206 | 6/1968 | Loveless | 220/345 X |
| 3,417,896 | 12/1968 | Loveless | 220/345 X |
| 3,768,203 | 10/1973 | Bellucci | 220/331 X |

Primary Examiner—George T. Hall
Attorney, Agent, or Firm—McDougall, Hersh & Scott

[57] ABSTRACT

A novel device for closing the dome of a tank with gravity and/or pneumatic discharge, comprising a closure cap member which is applied against a seat provided with a resilient sealing gasket, and a closure mechanism for holding the cap member on the seat, wherein the cap member comprises a protection cap provided with fixing means for the closure mechanism and a bearing surface whose surface is a surface of revolution and which is formed by at least one segment of a straight line and/or arc of a curve, wherein the seat comprises a support plate acting as an abutment for the bearing suface of the cap member, a resilient gasket which is loaded in bending by contact with the bearing surface of the cap member, and a co-operating flange for fixing the gasket on the support plate, and wherein the closure mechanism is operable with a low mechanical force.

The novel dome closure device is self-cleaning, self-sealing, operable with a low force, capable of being automated and having a high degree of safety for the operator.

12 Claims, 3 Drawing Figures

SELF-SEALING CLOSURE DEVICE FOR TRANSPORT TANK

The present invention concerns a novel device for closing the dome of a tank with gravity and/or pneumatic discharge, which is self-cleaning and self-sealing, which can be operated with a low mechanical force, and which can be automatically actuated, thereby guaranteeing the safety of the operators who are to use the device.

Many devices for closing tank domes are known and have been described in the specialist literature and have been constructed, since they are used on many mobile tanks which have gravity and/or pneumatic discharge. Devices of this kind, which are described for example in French standards NF 37006, 37007 or 38003 generally comprise a cap member and a sealing gasket, the cap member being provided with at least one hinge to permit the aperture of the tank to be opened, and fixing means such as for example 'Eye-bolts' with wing nut or wheel nut, to produce a strong clamping force, or cam systems.

The sealing action of such tank dome closure devices is provided by a powerful mechanical force which compresses the resilient gasket which is fitted into the cap member. However, devices of this kind rapidly lose their sealing action due to the cumulative effect of many harmful phenomena which occur in use of the device.

Of these harmful phenomena, some are so important that they must be described.

First of all, when filling the tank, even a very small amount of the product to be stored therein falls on to and remains on the bearing or contact surfaces of the gaskets, causing defective contact between the gasket and its seat, and also causing the product to be encrusted in the gasket when the device is closed, which causes the gasket to become hardened, followed by a deterioration in the gasket due to repeated operation of the device.

Since the gasket is subjected to multiple encrusting of solid substances and repetition of the closure operation and also, because the material of which the gasket is made is susceptible to natural ageing, the device must be tightened down with an increasing force in order to produce a satisfactory seal.

Therefore, it is a natural consequence of the above-mentioned phenomena that closing such devices requires an increased mechanical force, which requires the specialist operators to use spanners.

In that case however, the consequences of more serious phenomena have been observed, as an increased mechanical force required for sealingly closing the device causes irreversible deformation of the clamping surfaces of the nuts, which can then result in untimely and violent opening of the cap member, flexing of the domes in the periphery of the cap member by deformation of the tank at the points at which the cap member is anchored, rapid wear with deformation and even locking-up of the screw clamping system, giving rise to dangers of falling, injury and even death for the specialist operators who are required to open and close the device.

Finally, such known devices do not make it possible to envisage practical automation of operation of the device.

It is therefore no longer acceptable to envisage the possibility that such devices can still be used for closing a gravity and/or pneumatic discharge tank, since they are a permanent and lethal danger to the operators who are required to operate them.

It is in this spirit that the applicants, continuing their research in this area, discovered and perfected a device for closing a gravity and/or pneumatic discharge tank dome, which no longer suffers from the many disadvantages referred to above.

The closure device according to the invention comprising a closure cap member which is applied to a seat provided with a resilient sealing gasket and a closure mechanism for holding the cap member on the seat is characterised in that the cap member comprises a protection cap provided with fixing means connecting it to the closure mechanism and a bearing surface whose surface is a surface of revolution, that the seat is formed by a bearing plate which acts as an abutment for the bearing surface of the cap member, a resilient gasket which is loaded in bending by contact with the bearing surface of the cap and a co-operating flange for fixing the gasket to the bearing plate, and that the closure mechanism is operable with a low mechanical force.

The cap member of the closure device according to the invention comprises a protection cap of known type but also a bearing surface in respect of which it has been stated that the surface is a surface of revolution. The bearing surface may be formed by a segment of a line or an arc or by a combination thereof, and the segment of arc may give a convex or concave surface. Therefore, the surface of revolution of the bearing surface may be for example frustroconical, hemispherical, semi-elliptical, parabolic, convex or concave hyperbolic, etc.

The cap member which is formed by the protection cap and the bearing surface is made of a rigid strong material such as a cast or shaped metal, for example aluminium, alloys of aluminium, a steel, etc, or such as a polymer material, for example polyamide, polyimide, polyesters, polyacrylic, polyhalogens, which may or may not be reinforced with metal, glass, carbon, etc. fibres or cloths.

The shape of the cap member is so selected that it closes the orifice to be closed and protects it from rain and other matter and objects projected thereonto, but also so that it is self-cleaning by virtue of the surface of revolution of the bearing surface, and finally so that the bearing surface serves as a support in respect of the seat and provides for sealing contact with the gasket.

The seat against which the closure cap member bears is generally formed by a ring-shaped support or bearing plate. It is also provided with a gasket of the same shape but whose inside diameter is smaller than the inside diameter of the seat, but which is subject to a bending loading and not a compression loading, as in the known art, said gasket being made of a sufficiently flexible synthetic, artificial or natural polymer material, which may optionally be reinforced by means of cloths or fibres based on natural, artificial or synthetic, metal, glass, carbon etc. materials. However, the gasket may also be made of flexible material, for example stainless steel, brass, aluminium, nickel silver, etc.

The seat of the closure device may also comprise a guide means for the tank filling pipe. Thus, when the orifice is closed, the bearing surface of the cap member penetrates into the gasket, which by bending, causes the bearing surface to be cleaned by a rubbing action, causing parasitic matter and matter clinging to the bearing surface to be pushed towards the exterior. Accordingly, the contact between the gasket when in the flexed condition, and the bearing surface of the cap member, is intimate and provides for the required sealing action. The sealing action improves as the pressure obtaining within the tank increases after the tank has been closed, with the gas pushing the gasket against the bearing surface of the cap member.

The closure mechanism for holding the cap member on the seat may be of known type, for example with peripheral clamping, with swinging eye bolt or with central clamping by means of a stirrup member, but these types of closure mechanism do not permit the opening-closing operation of the cap to be automated. Such a closure mechanism affords the advantage, in comparison with the previously known closure devices, that it permits the device to be clamped tight without force since the gasket does not have to be compressed.

In order to be automatically controlled, the cap member closure mechanism must permit a horizontal approach movement and a vertical closure movement to be performed.

In a first alternative form, the cap member is fixed to the end of an arm while the other end of the arm is held by a pivot about which a double movement of partial rotation is effected, the first movement being effected in a horizontal plane in such a way that the cap member is moved from its rest position to the dome to be closed, and the axes of the cap member and the dome are aligned, while the second movement takes place in a vertical plane by downward movement of the arm until the dome has been closed.

In accordance with another form of the assembly, the closure mechanism comprises two fixed slides against which there bear rollers of a carriage which is connected to the cap member by link members which have a self-locking action by passing beyond an equilibrium point, and which is provided with a safety latch. Therefore, when the cap is closed, the horizontal approach movement may be effected by the translatory movement of the carriage, and the vertical closure movement may be effected by the assembly of link members.

In a last alternative form, the closure mechanism also comprises two parallel slides which however are pivoted about a pivot point so that they can be raised, against which slides bears the cap member which is provided with rollers or slide runners, and a system for lowering said slides, comprising a link-crank member which is self-locking by passing beyond the equilibrium point.

The invention will be better understood by reference to the description with reference numerals which can be found in the various accompanying drawings.

Figure 2:
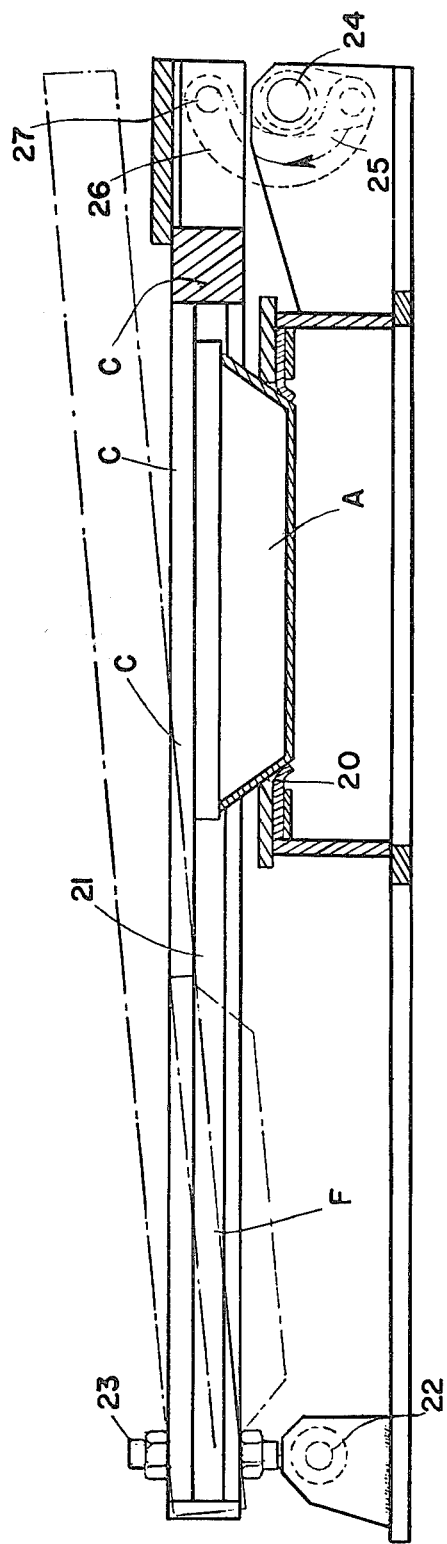
Figure 3:
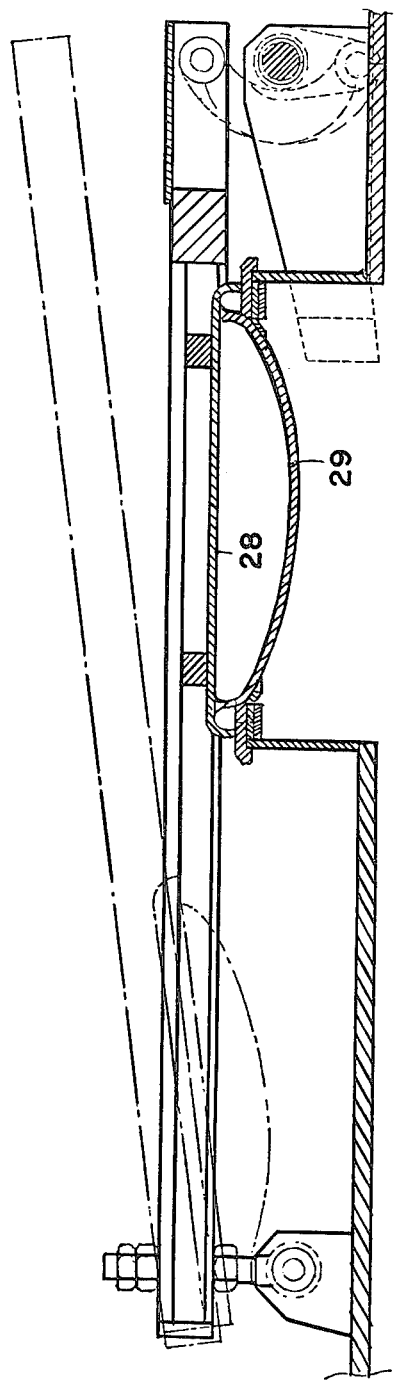

FIG. 1 shows a view in vertical section of the device for closing a tank dome, comprising a closure mechanism which can be automated, with two fixed slides, FIG. 2 shows a view in vertical section of the device for closing a tank dome, comprising a closure mechanism which can be automated, with two parallel pivoted slides, and FIG. 3 also shows a view in vertical section of the closure device comprising a cap member whose bearing surface is a semi-elliptical surface.

Referring to FIG. 1, the closure device comprises a cap member A, the seat B and the closure mechanism C.

The cap member A comprises a portection cap 1 and a bearing surface 2 which is formed by two straight line segments 3 and 4 and whose surface is a surface of revolution and is produced by combining a truncated cone formed by 3 and a cylinder formed by 4. The cap member A is also provided, on the protection cap 1, with fixing means 5 and 6 for fixing the closure mechanism C.

The seat B against which the closure cap member A bears comprises the horizontal support plate 7 provided with a gasket 8 which is held against the support plate 7 by a co-operating plate 9. The seat B also has a guide means 10 for guiding the pipe (not shown) for filling the tank.

When the cap member is closed, the bearing surface 2 of frustoconical shape comes into contact with the gasket 8 which flexes and scrapes the bearing surface 2. Thus, contact between the bearing surface 2 and the gasket 8 is particularly intimate since it is free of all the parasitic materials which had been deposited thereon when the tank was filled. This contact is further increased when the tank is pressurised to provide for discharging thereof, thereby producing a virtually total seal.

As regards the closure mechanism C for the cap member A, this mechanism comprises a carriage 11 which is provided with running rollers 12, 13 and 14 which permit displacement of the carriage 11 in two slides 15 (only one is visible in the drawing), and link members 16 and 17 which provide for a mechanical connection between the carriage 11 and the cap member A.

The closure mechanism is locked in the closed position by the latch 18.

When the tank is opened, the latch 18 is unlocked and the carriage 11 is then moved towards the other end of the slides 15.

In a first stage, the roller 14 carried by the link member 16 rolls against the ramp member 19 which is fixed with respect to the slide 15. The cap member A is thus lifted away from the seat and then, when the roller 14 reaches the top of the ramp member 19 and is displaced in the slide 15, the cap member A is entrained horizontally to the rest position in region D, as shown in dash-dotted lines in the drawing. The opening operation can be performed manually but it may also be performed automatically by using a hydraulic, pneumatic or electrical jack which acts on the carriage 11.

The jack may be fixed on the tank itself or on a filling station which is independent of the tank.

Referring to FIG. 2, the cap member A has a frustoconical bearing surface 20.

The remainder of the cap member A and the whole of the seat B are similar to the cap member A and the seat B in FIG. 1, and for that reason will not be described again here.

The mechanism C for closing the cap member A comprises two parallel slides 21 (one of which is not visible in the drawing) in which the cap member A slides.

The two slides are pivoted on spindles 22 (only one is shown) by means of the adjustable fixing boss member 23.

At the end of the slides which is remote from the pivot mounting 22 is a locking means E which comprises a horizontal spindle 24 which is fixed with respect to two cranks 25 (only one is shown in broken line), acting on two elbow-bent link members 26 (only one of which is shown) which are pivoted by means of spindles 27 on the slides 21.

When the tank is opened, the spindle 24 is rotated in the direction indicated by the arrow by means of a lever (not shown), with the crank 25 acting on the link member 26 raising the slides 21 by way of the spindle 27.

The cap member A is then raised vertically and then performs a translatory movement to the rest position in region F which is shown in broken line in the drawing.

The opening operation may be performed manually but it may also be performed automatically by using hydraulic, pneumatic or electrical jacks acting on the lever (not shown) of the mechanism E and on the cap member A.

In FIG. 3, the closure mechanism C is the same as that described in the embodiment of FIG. 2. Only the cap member A is different from those already described hereinbefore. In this particular case, it is produced with stamped standardised shapes; this applies to the cap 28 and the bearing surface 29.

Just as in the embodiment shown in FIG. 2, the opening operation may be manual or automatic.

As the applicants have abundantly shown in the description of the drawings illustrating the closure device according to the invention, the closure device provides many novel and appreciable features which advantageously eliminate the disadvantages of the prior art devices.

Among its most important features, the closure device is found to be self-cleaning, self-sealing, operable with a small force, capable of being automated and providing a high degree of safety with regard to the personnel who are required to operate the device.

I claim:

1. A novel device for closing the dome of a tank with gravity and/or pneumatic discharge, which is self-cleaning, self-sealing, operable with a low force, capable of being automated and having a high degree of safety for the operator, comprising a closure cap member which is applied to a seat provided with a resilient sealing gasket, and a closure mechanism for holding the cap member on the seat, characterised in that the cap member comprises a protection cap provided with fixing means for the closure mechanism, and a bearing surface whose surface is a surface of revolution and which is formed by at least one segment of a straight line and/or arc of a curve, that the seat comprises a support plate acting as an abutment for the bearing surface of the cap member, a resilient gasket which is loaded in bending by contact with the bearing surface of the cap member and a co-operating flange for fixing the gasket on the support plate, and that the closure mechanism is operable with a low mechanical force.

2. A novel device according to claim 1 characterised in that the bearing surface of the protection cap is a convex or concave surface.

3. A novel device according to claims 1 or 2 characterised in that the bearing surface of the protection cap is a frustoconical, hemispherical, semi-elliptical, parabolic or hyperbolic surface.

4. A novel device according to claim 1 characterised in that the support plate of the seat is horizontal.

5. A novel device according to claim 1 characterised in that the gasket which is loaded in bending is of metallic material or natural or synthetic polymer material, with optional reinforcement.

6. A novel device according to claim 1 characterised in that the seat comprises a means for guiding the filling pipe.

7. A novel device according to claim 1 characterised in that the closure mechanism which has a low mechanical force for operation is of known type.

8. A novel device according to claim 7 characterised in that the closure mechanism which has a low mechanical force for operation is of peripheral clamping, swinging eye bolt type.

9. A novel device according to claim 7 characterised in that the closure mechanism with low mechanical force for operation is of the central clamping stirrup type.

10. A novel device according to claim 1 characterised in that the closure mechanism is operable by horizontal approach and vertical closure movements, that it comprises two fixed slides against which bear rollers of a carriage which is connected to the cap member by link members with a self-locking action by passing beyond the equilibrium point, and which is provided with a safety latch.

11. A novel device according to claim 1 characterised in that the closure mechanism comprises two parallel slides which are pivoted about a pivot point so as to be capable of being raised, against which slides bear the cap member which is provided with rollers or slide shoes and a system for lowering said slides, comprising a link-crank assembly which is self-locking by passing beyond the equilibrium point.

12. A novel device according to claims 10 or 11 characterised in that the closure mechanism is actuated by a hydraulic, pneumatic or electrical jack.

* * * * *